Figure 1:
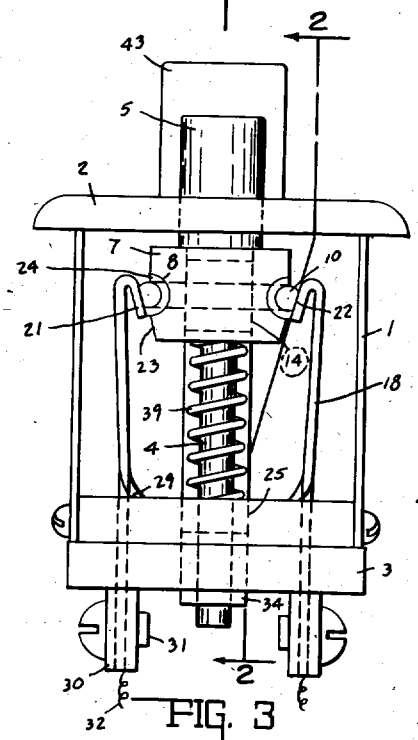

April 27, 1926. Re. 16,336

R. H. MAPLE

THERMALLY OPERABLE SELF SOLDERING CIRCUIT BREAKER

Original Filed April 26, 1918 2 Sheets-Sheet 1

INVENTOR.
ROY H. MAPLE.

BY Lockwood & Lockwood

ATTORNEYS.

April 27, 1926.

R. H. MAPLE

Re. 16,336

THERMALLY OPERABLE SELF SOLDERING CIRCUIT BREAKER

Original Filed April 26, 1918 2 Sheets-Sheet 2

INVENTOR.
ROY H. MAPLE.

BY Lockwood & Lockwood

ATTORNEYS.

Reissued Apr. 27, 1926. Re. 16,336

UNITED STATES PATENT OFFICE.

ROY H. MAPLE, OF INDIANAPOLIS, INDIANA, ASSIGNOR TO R. H. MAPLE CO., OF INDIANAPOLIS, INDIANA, A CORPORATION.

THERMALLY-OPERABLE SELF-SOLDERING CIRCUIT BREAKER.

Original application filed April 26, 1918, Serial No. 230,882. Renewed October 24, 1923. Original No. 1,478,481, dated December 25, 1923. Application for reissue filed December 21, 1925. Serial No. 76,939.

*To all whom it may concern:*

Be it known that I, ROY H. MAPLE, a citizen of the United States, and a resident of Indianapolis, county of Marion, and State of Indiana, have invented a certain new and useful Thermally-Operable Self-Soldering Circuit Breaker; and I do hereby declare that the following is a full, clear, and exact description thereof, reference being had to the accompanying drawings, in which like numerals refer to like parts.

This invention relates to self soldering circuit breakers of the fusible type and one feature of the invention is the provision in connection with a self soldering circuit breaker including contact blades and a latch, of a locking pinion and contact pinion support held normally in fixed relation with each other by fusible material.

One of the main features of the invention consists in the provision of a substantially U-shaped thermal element anchored at opposite sides adjacent the ends or at the ends and through which current passes longitudinally, the mid-portion of said U-shaped thermal element being arranged to retain the circuit breaker parts in closed circuit position but automatically releasing said circuit breaker parts and permitting the same to move into open circuit relation upon the passage of an abnormal or an over-load current through said U-shaped thermal element, the retaining or catch mechanism being associated with the mid-portion of said U-shaped thermal element.

A further feature of the invention is in so constructing the locking pinion and the latch cooperating with said locking pinion that when released by an overload, the rotation of the locking pinion will be limited by the latch to bring the same in position for reengagement with the latch when the parts of the circuit breaker are returned to closed position.

A further feature of the invention is the manner of attaching the fuse controlled parts of the circuit breaker whereby said parts may be quickly attached to or removed from the circuit breaker without disconnecting or removing any parts of the circuit breaker.

A further feature of the invention is the provision, in connection with the locking pinion and contact pinion support, of means upon their meeting surfaces to give a positive locking effect with the fusing material when in normal condition and without interfering or affecting the rotating movement of the pinion when the fusing material is softened.

A further feature of the invention is the provision of means for manually operating the circuit making and breaking mechanism.

A further feature of the invention is the provision of means for fusing the material for holding the pinion and its support in fixed relation from currents of different values.

A further feature of the invention is the provision of a push rod for carrying the locking pinion and its support and providing means thereon for positively moving the contact pinion support out of engagement with the contact blades.

A further feature of the invention is to provide an insulating block on the push rod and so mount the locking pinion and its support thereon that said support will be held against lateral or twisting movement and the pinion held against longitudinal movement. A further feature of the invention is in so constructing the contact ends of the blades and the parts of the insulating block and pinion support that they will accelerate the disengagement of the contact pinion support from the contact blades.

A further feature of the invention is the provision of an insulated supporting base for the parts of the circuit breaker and so constructing the same that the push rod and latch may be readily attached thereto or removed therefrom while in assembled position.

A further feature of the invention is in so mounting the latch upon the push rod and supporting base that said latch may be manually raised and released from the locking pinion without causing the latch to bend to have yielding movement in any part thereof.

Figure 2:
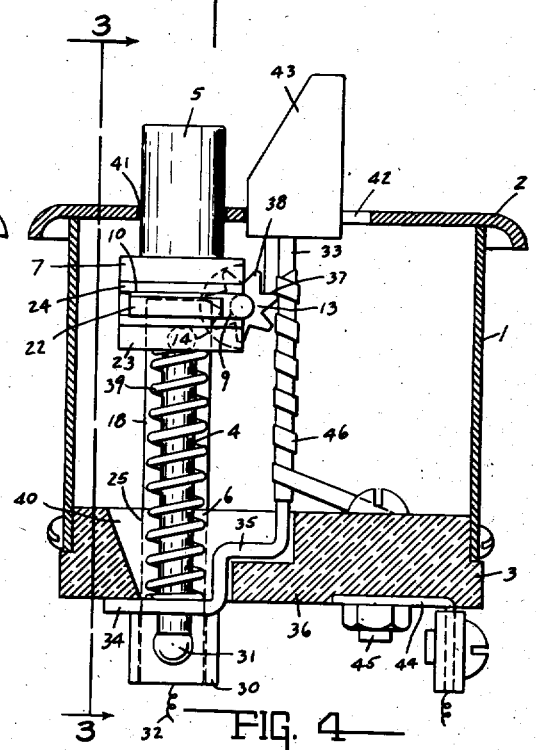
Figure 3:
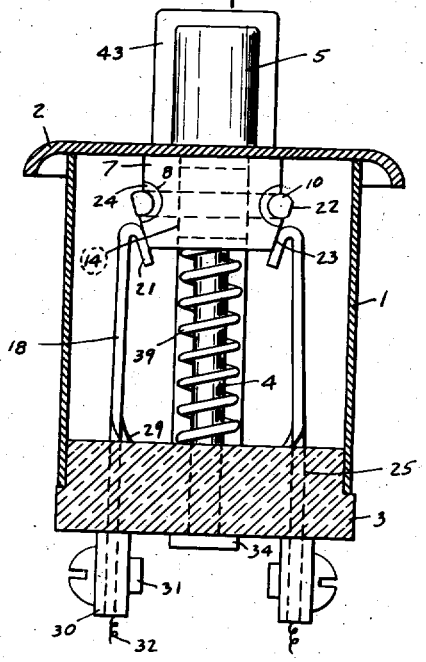
Figure 4:
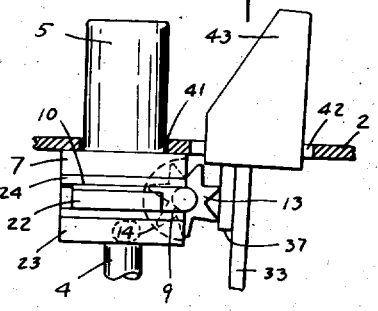
Figure 5:
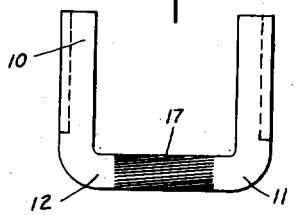
Figure 6:
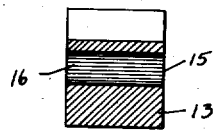
Figure 7:
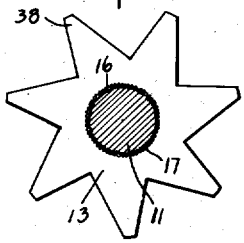
Figure 8:
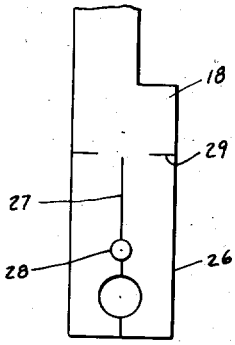
Figure 9:
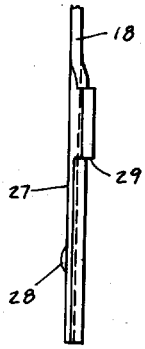
Figure 10:
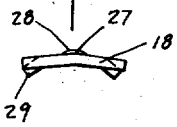
Figure 11:
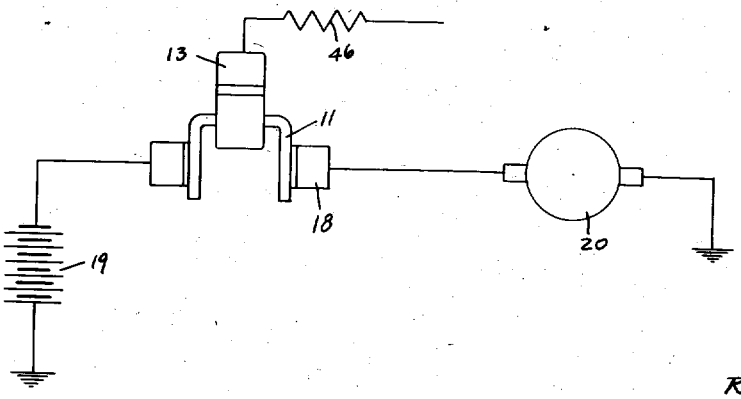

The full nature of the invention will be understood from the accompanying drawings and the following description and claims:

In the drawings Fig. 1 is a bottom plan view of the circuit breaker in closed position. Fig. 2 is a sectional view thereof as seen on line 2—2 of Fig. 1. Fig. 3 is a sectional view as seen on line 3—3 of Fig. 2, with the circuit breaker in open position. Fig. 4 is a detail side elevation of the forward portion of the push rod and interlocking parts in unlocked position, the casing therefor being shown in section. Fig. 5 is a plan view of the contact pinion support. Fig. 6 is a vertical longitudinal section through the locking pinion. Fig. 7 is an enlarged end elevation of the locking pinion showing the contact supporting member in section. Fig. 8 is a front elevation of the lower end of one of the contact blades. Fig. 9 is an edge elevation thereof. Fig. 10 is an end elevation thereof. Fig. 11 is a diagrammatic view of the circuit breaker, showing the manner of connecting the same to the battery, ignition system and generator.

Referring to the drawings in which similar reference numerals designate corresponding parts throughout the several views, 1 indicates an enclosing frame, to the forward end of which is attached a cover plate 2, and to the rear end of which is attached, in any suitable manner, a supporting base 3, said base being preferably constructed of insulating material. Extending through the frame 1 is a push rod 4, the forward end of which is provided with a button 5 which projects through an opening in the cover plate 2, while the opposite end of the rod projects through an opening 6 in the supporting base 3, said rod having an insulating block 7 surrounding the same, and preferably resting against the inner end of the push button 5. The block 7 is provided at each side with a vertical seat or groove 8 and across its top is a transverse seat or groove 9, the vertical grooves being designed to receive the contact ends 10 of the bent or substantially U-shaped pinion support 11, the horizontal bar 12 of the pinion support having a locking pinion 13 mounted thereon, which enters a recess 14 in the upper face of the block 7.

The locking pinion 13 is normally held in fixed relation with the horizontal bar 12 of the pinion support by placing a thin layer of fusible material around the horizontal bar over which the locking pinion is placed and in order to give a positive locking action between the bar 12 and interior of the pinion 13, the inner wall of the opening 15 through the pinion is provided with corrugations 16 (see Fig. 7) while the surface of the horizontal bar 12 over which the pinion fits is provided with corrugations 17, and as the fusible material necessarily enters the depressions between the corrugations it will more firmly lock the pinion to the support. As it is necessary for the pinion 13 to rotate at times, and as it requires a close fit between the horizontal bar 12 and the interior of the locking pinion, the corrugations 16 are extended in a straight line from end to end of the pinion, while the corrugations 17 (see Fig. 5) of the bar 12 are spirally arranged so that while the fusible material will have positive interlocking action, yet the corrugations 16 will ride over the corrugations 17 when the locking pinion is rotated without any frictional or interlocking action between the corrugations, thus providing the same action of movement between said parts as would result were the corrugations omitted.

Extending through the supporting base 3 are contact blades 18, one of which is connected with the battery 19 and the other with the generator 20, the free ends of said contact blades having rearwardly curved fingers 21, which are disposed at an angle to the trend of the contact blades, the outer face of said fingers being designed to engage the depending contact ends 10 of the pinion support, said contact ends having flattened faces 22 (see Figs. 1, 2 and 3) so as to provide a perfect contact with the fingers. The rear portion of the vertical faces of the block 7 are also tapered inwardly as shown at 23 so that the block can readily pass between the fingers 21 and by inclining the fingers and the contact portions of the ends 10 as shown, the spring action of said fingers will tend to force the push rod 4 forwardly to break the circuit between the contact ends 10 and the fingers 21.

As best shown in Figs. 1 and 3 layers of carbon 24 may be introduced between the contact ends 10 and the block 7, said blocks having an outwardly extending beveled face upon which the fingers 21 make the final break, thus obviating any possibility of an arc forming when the circuit breaker is opened or closed. The inclined ends of the contact blades 18 are entered through slots 25 in the supporting base 3, and in order to securely hold the blades in fixed relation with the block, the ends 26 of the blades passing through said slots are crimped in such manner that they will be slightly bowed (see Fig. 10), causing the central portion or rib 27 to bind against one face of the slots while the edges of the ends on the opposite sides press against the opposite walls of the slots, thereby securely binding the contact blades within the slots.

In order to prevent the blades from being casually removed from the slots, a portion of the ends 26 are struck out to form a projection 28 which passes through the slots and beyond the rear face of the supporting base, while the movement of the blades is stopped by slitting the side edges of the blades and bending the upper portion of the slitted parts forwardly to form shoulders 29, which rest against the opposite face of the supporting base from the projection 28.

After the contact blades are properly attached to the supporting base, clamps 30 are attached to the ends projecting rearwardly of the base by means of binding screws 31, which screws also attach the wires 32 to the contact blades.

The push rod 4 is held in its inward position so that the contact blades 18 will engage the contact ends 10 of the pinion support through the medium of the latch 33, the inner end 34 of which is bent at right angles and extended over the push rod 4, said latch also having an angularly shaped bent portion 35 which cooperates with the shoulder 36 on the supporting base 3, said shoulder limiting the upward movement of the rear end of the latch. The end 34 of the latch is entered through the opening 6 and is of sufficient length to overlap the rear face of the supporting base 3, and this prevents forward movement of the latch while the shoulder prevents rearward movement of the latch. A shoulder 37 is formed on the latch adjacent its forward end which shoulder normally rests in the path of one of the teeth 38 of the pinion 13, and when the shoulder is engaged with said tooth, which always projects vertically of the push rod, said push rod will be held in engagement with the fingers 21 of the contact blades, until such time as the latch is manually disengaged from the pinion, or until the fusible material is softened by the excess amperage so as to permit the pinion to rotate upon the pinion support, and in either event the push rod and parts carried thereby are thrown forwardly by the tension of the spring 39 surrounding the push rod between the end 34 of the latch and the block 7 on the push rod.

In case that the fusible material is brought to a softened state by excess current so as to break the circuit by permitting the push rod to move forwardly, the shoulder 37 will cause the pinion to rotate and as the next succeeding tooth will engage the lower face of the latch, said next succeeding tooth will be moved to vertical position as shown in Fig. 4, and as the latch is then resting on two of the teeth, the pinion will be held against further rotation, thereby positively positioning the pinion for reengagement with the shoulder of the latch so that when the fusible material again hardens and the push rod is moved inwardly, the shoulder of the latch will engage the vertically extending tooth and hold the circuit breaker in closed position until such time as the fusible material is again softened, or the latch manually disengaged from the pinion.

As it would be a difficult matter to attach the push rod to the latch after the latch is positioned in the supporting base, it is preferable to first assemble these two parts by introducing the end of the push rod through the opening in the end 34 of the latch and then engaging the shoulder of the latch with the locking pinion and when so assembled the forward ends of the latch and push rod are turned downwardly at an angle to the supporting base 3, the opening 6 having a flared or inclined lower end 40 to permit of such movement of the latch and push rod. After the end 34 of the latch has been introduced through the opening 6, said latch and push rod are swung upwardly and extended at right angles to the supporting base, the lower end of the angular extension 34 over-hanging the face of the supporting base to prevent the withdrawal of the latch.

The cover plate 2 is then introduced over the end of the frame 1, the ends of the push rod and latch projecting through the openings 41 and 42 respectively in said cover plate. As it is sometimes necessary to manually operate the circuit breaker, a head 43 of any suitable insulating material is attached to the outer end of the latch so that it can be grasped by the hand without causing a shock.

In order to connect the ignition current to the electric circuit, a contact plate 44 is attached to the base 3 by means of a bolt 45, said bolt being attached to the latch 33 by means of a resistance member or coil 46. The object in providing the resistance coil is to sufficiently heat the locking pinion as to soften the fusible material from a low amperage, the ignition system carrying approximately 5 amperes, while the generator carries approximately 30 amperes, the resistance coil serving to create the same amount of heat as is created through the contact blades and contact ends of the pinion support.

In operation, the push rod being moved inwardly until the locking pinion is engaged with the shoulder of the latch, should an overload occur, either through the contact blades or through the resistance coil 46, the pinion 13 will become sufficiently heated as to soften the fusible material between the locking pinion and pinion support, whereupon the pressure of the spring 39 will force the push rod and parts carried thereby forwardly, thus disconnecting the contact blades 18 from the contact ends 10 of the pinion support and thus breaking the circuit between the battery and other parts. As the push rod moves forwardly, the shoulder on the latch will cause the locking pinion to rotate, thereby bringing the next succeeding tooth into engagement with the under face of the latch and as the previously engaged tooth and the newly engaged tooth are both pressing against the lower face of the latch, the rotating movement of the locking pinion will be limited and said teeth are so arranged that the new tooth will be properly positioned for interlocking with the shoulder of the latch, and is positively held in this position until the fusible material again hardens, thereby again locking the pinion and the pinion support together. The push rod may then again be moved inwardly and the latch re-engaged with the newly positioned tooth on the locking pinion and held in said position until another overload occurs or until upward pressure is applied to the head 43 to manually disengage the latch from the locking pinion.

By arranging the fuse mechanism in this manner, many operations of the circuit breaking mechanism may be obtained, as the fusible material will last indefinitely under ordinary conditions and will reset or harden practically instantaneously after it has been fused and the circuit broken. Should an intense overload occur, such as would destroy the fusible material, or should the circuit be broken a sufficient number of times through overloads as to consume or destroy all of the fusible material, a new pinion support and pinion can be quickly introduced in the place of the one worn out or destroyed, as it is but necessary to raise the latch or move the same from over the locking pinion so that the U-shaped pinion support may be removed and a new one introduced in its place.

It will further be seen that in addition to the continued resetting of the locking pinion, the operation thereof will be as effective and as rapid as when the ordinary fuse plug is used, with the added advantage that it is not necessary to provide a new fuse with this device, each time an overload occurs, and the circuit breaker is operated as is necessary with the ordinary form of fuse.

It will likewise be seen that by arranging the corrugations or ribs of one part in a straight line and arranging the corrugations or ribs of the other part substantially spirally or in non-parallel relation, there is no opportunity for said roughened or projecting surfaces interlocking with each other although a close fit is maintained, as a part of the straight corrugations will always rest across parts of the spirally arranged corrugations.

It will further be seen that by arranging the corrugations in this manner particles of the fusible material will enter between the corrugations and thereby reinforce the fusible material and more securely interlock the pinion with its support.

In addition to the advantages previously enumerated a further advantage is the manner of so arranging the parts that the same locking pinion can be employed in connection with two different currents of appreciably different values, either of which, when receiving an overload will soften the fusible material and release the circuit breaker.

The invention claimed is:

1. A self-soldering circuit breaker, including a locking pinion, a support formed of one strip of metal and having angularly extending ends to which said pinion is soldered, and means in which said angular ends of the pinion support are removably supported for passing an electric current longitudinally through said support.

2. A self-soldering circuit breaker, including a locking pinion, a support formed of one strip of metal substantially U-shaped, on the middle portion of which the pinion is soldered, means for removably mounting said support, and means for passing an electric current longitudinally through said support.

3. A self-soldering circuit breaker including a locking pinion, a support having two angularly disposed ends with the locking pinion soldered on the portion intermediate said ends, and means in which said angular ends of the pinion support are mounted so as to be slidably removable.

4. A self-soldering circuit breaker including a locking pinion, a U-shaped support on the middle portion of which the pinion is soldered, and means in which the ends of said support are mounted so as to be slidably removable.

5. In a self soldering circuit breaker, the combination with an insulated mounting means having seats therein, of a locking pinion, and a support for said locking pinion having parts thereon arranged to enter said seats and hold the support against lateral or twisting movement.

6. In a self soldering circuit breaker, the combination of a locking pinion with a corrugated central opening, a corrugated support for the pinion, said corrugations being in non-parallel relation and a fusible material on said corrugated surfaces.

7. In a self soldering circuit breaker, the combination of a locking pinion, a supporting member therefor formed of one strip of metal substantially U-shaped and having contact terminals, and insulating means between the contact terminals of the supporting member.

8. In a self-soldering circuit breaker, the combination of a locking pinion, a supporting member therefor formed of one strip of metal having two angularly extending ends forming contacts and a middle portion upon which the locking pinion is supported, and insulating means upon the contacts of the supporting member.

9. In a self soldering circuit breaker, the combination with a locking pinion having an opening, said opening having corrugations, of a support for said pinion, that portion of the support passing through the locking pinion having corrugations thereon, the corrugations of one part extending in a straight line and the corrugations of the other part being spirally arranged.

10. In a thermal circuit breaker, the combination of a circuit breaker switch means, a catch therefor, fusible means for maintaining said catch in operative position and for releasing said catch upon the passage of a predetermined current through said switch means, manually operated means for closing said switch means, and other manually operated means for opening said switch means and releasing the same from engagement with said catch.

11. In a self soldering circuit breaker, the combination with an insulating block having grooves therein, of a locking pinion, a support for said pinion, said support having ends adapted to enter said grooves for holding said pinion and support against lateral or twisting movement.

12. In a self soldering circuit breaker, the combination with a locking pinion having teeth thereon, a support for said pinion, and fusible material between said pinion and its support adapted to be fused when an overload occurs, of means adapted to engage one of said teeth and lock the circuit making and breaking mechanism in closed position under normal conditions, said locking means causing the pinion to rotate when the material is fused and the circuit making and breaking mechanism opened, and positioning the next tooth for engagement with the locking mechanism and holding the pinion so positioned until the fusible material is reset.

13. In a self soldering circuit breaker, the combination with a locking pinion having teeth thereon, a support therefor, and fusible material between the pinion and its support for normally holding the pinion in fixed relation with the support, of a latch adapted to engage one of the teeth of said pinion to hold the circuit making and breaking mechanism in closed position under normal conditions, said latch causing said pinion to rotate when the fusible material is fused from an overload and the parts carrying the pinion are moved outwardly, said latch positioning a succeeding tooth for re-engagement with the latch and holding the same in fixed position until the fusible material is reset, whereby continued operations of the circuit making and breaking mechanism may be accomplished without renewing the fusing parts.

14. In a self soldering circuit breaker, the combination with a locking pinion having teeth thereon, a pinion support and fusible material between the support and the pinion adapted to be repeatedly fused and reset, of a locking latch adapted to interlock with one of the teeth of said pinion to hold the circuit making and breaking mechanism in closed position under normal conditions, said latch being arranged to position the next succeeding tooth for re-engagement with the latch and hold said tooth in its set position until the fusible material is reset.

15. In a self soldering circuit breaker, the combination with a locking pinion having a plurality of teeth thereon, a pinion support and fusible material for normally holding the locking pinion against rotation upon the support, of circuit making and breaking mechanism, a latch adapted to engage one of the teeth of the pinion to hold the circuit making and breaking mechanism in closed position, said latch being adapted to engage two of the teeth when the fusible material is fused, whereby one of the teeth will be positioned for engagement with the latch when the circuit making and breaking mechanism is again closed and held in said position until the fusible material is reset, whereby a multiplicity of fusing actions may result without changing any of the fusing parts.

16. In a self soldering circuit breaker, the combination with a locking pinion having a plurality of teeth thereon, and fusible material for normally holding the locking pinion against rotation, of circuit making and breaking mechanism, a latch adapted to engage one of the teeth of the pinion to hold the circuit making and breaking mechanism in closed position, said latch being adapted to engage two of the teeth when the fusible material is fused, whereby one of the teeth will be positioned for engagement with the latch when the circuit making and breaking mechanism is again closed and held in said position until the fusible material is reset whereby a multiplicity of fusing actions may result without changing any of the fusing parts, and means to manually release the latch from the locking pinion.

17. In a self soldering circuit breaker, a locking pinion, a pinion support, fusible material for normally holding the locking pinion against rotation upon the support, and means to connect different currents of different values with said locking pinion whereby either current will cause the fusible material holding the locking pinion to fuse when an overload occurs.

18. In a self soldering circuit breaker, the combination with a locking pinion, means to normally hold the pinion against rotation, and a base having an opening therethrough, of circuit making and breaking mechanism, a latch adapted to cooperate with said pinion to normally hold said circuit making and breaking mechanism in closed position, one end of said latch extending at right angles and adapted to project through said opening and overlap the face of the base member to hold the latch against longitudinal movement, the walls of said opening holding the latch and parts connected therewith against rotation.

19. In a self soldering circuit breaker, the combination with a push rod, a base member having an opening therethrough, and a locking pinion carried by the push rod, of a latch adapted to engage said locking pinion to normally hold the push rod against outward movement, said latch having an angular extension at one end, adapted to extend through the opening in the base and overlap the face of the base to hold the latch against longitudinal movement, said opening having a flared portion whereby the end of the latch and push rod may be introduced through the opening when in assembled position.

20. A self soldering circuit breaker including a push rod, an insulating block carried thereby, a locking pinion carried thereby and fusibly mounted, and a latch yieldingly mounted on the push rod for engaging said pinion.

21. A self soldering circuit breaker including a push rod, an insulating block carried thereby, a locking pinion carried by the block and fusibly mounted, a latch for engaging the locking pinion, and a spring for holding the latch in locking position normally and for actuating the push rod when the latch is released.

22. In a self soldering circuit breaker, the combination with a push rod, a block carried thereby, and a locking pinion carried by the block, of a latch, a base having an opening through which one end of the latch and the push rod operates, and a spring holding the latch in locking position so the latch may be manually released from the locking pinion without bending any part of the latch.

23. In a self soldering circuit breaker, the combination of a locking pinion, a support therefor, and fusible material for normally holding the pinion fixed to its support, of a latch for engagement with said locking pinion, means to connect said latch with a circuit, and a current carrying resistance carried by said latch for causing the fusing of the fusible material when an overload of current occurs.

24. A self soldering circuit breaker, including current carrying means adapted to be connected to different circuits of different current values, and a single fusing point associated with said current carrying means and adapted to be operated from either of the currents in said means when so connected.

25. In a self soldering circuit breaker, the combination with a push rod, and an insulating block carried thereby, said insulating block having grooves therein and a recess, of a locking pinion adapted to enter said recess and be held thereby against longitudinal movement, and a substantially U-shaped support for said locking pinion, the extending ends thereof entering said grooves so as to be removedly held into engagement with the insulating block.

26. A self soldering circuit breaker, including current carrying means adapted to be connected to different circuits of different current values and a single fusing means to which all of said current carrying means are attached, adapted to be operated by any of the currents in said means when so connected.

27. A self soldering circuit breaker including a fusibly mounted pinion and a latch in engagement therewith for controlling said circuit breaker, and manually operated means for releasing said latch.

28. A self soldering circuit breaker including a push rod, an insulating block carried thereby, a locking pinion carried thereby and fusibly mounted, a latch yieldingly mounted on the push rod for engaging said pinion, and insulating means connected with said latch and adapted to be manually operated for releasing the latch.

29. A self soldering circuit breaker including a push rod, an insulating block carried thereby, a locking pinion carried thereby and fusibly mounted, a latch yieldingly mounted on the push rod for engaging said pinion, and means for preventing substantially any turning movement in the latch.

30. A self soldering circuit breaker including a push rod, an insulating block carried thereby, a locking pinion carried thereby and fusibly mounted, a latch yieldingly mounted on the push rod for engaging said pinion, said latch having a bend in it, and a base having a recess in which said bend operates and formed to prevent any turning movement of said latch.

31. A self soldering circuit breaker including a push rod, an insulating block carried thereby, a locking pinion carried thereby and fusibly mounted, a latch yieldingly mounted on the push rod for engaging said pinion, a casing with an angular slot in it, an insulating block secured to said latch and extending through the slot in the casing and angular in cross section so that it cannot turn in said slot, and whereby the latch can be manually operated.

32. A self soldering circuit breaker including a locking pinion, a support on which said pinion is soldered, and means for mounting said pinion support and provided with a slot to form projections beside said pinion to prevent longitudinal movement thereof upon the support when the solder is fused.

33. A self soldering circuit breaker including a movable support, a locking pinion soldered and arcuately movable thereon when the solder is fused, and means for bringing the pinion after arcuate movement into a definite position upon said support for subsequent operation while the solder is fused.

34. A self-actuated circuit breaker including a locking pinion, a support formed of one elongated strip of metal and having an angularly extending end, said pinion being mounted upon said support, means interposed between said support and said pinion for normally securing said pinion non-rotatably on said support and fusible by heat to release said pinion for rotation upon said support, and means for passing an electric current longitudinally through said support, said pinion securing means being fusible by the heat generated in said support when an overload of current is passed through the same.

35. A circuit breaker including in combination a U-shaped pinion support, a locking pinion rotatably mounted on said support and normally secured thereto in non-rotatable relation. means for securing said U-shaped support, and means for passing an electric current longitudinally through said support, said locking pinion being rotatable when an overload of current is passed through said support.

36. In a self soldering circuit breaker the combination of a pinion support, a pinion on said support, fusible means normally securing said pinion to said support, a contact for supplying current to said support, and a latch engagable by said pinion for maintaining said contact in closed circuit position, said pinion being rotatable when an abnormal electric current is passed through said support and fuses said fusible means to release said contact from the closed circuit position, said contact tending to move the pinion support to open said circuit.

37. A self soldering circuit breaker including in combination a pinion support, a locking pinion rotatable on said support and normally held in non-rotatable relation thereon, means for supplying current to said pinion support so that the same passes longitudinally thereof, said pinion being rotatable on said support when an overload of current is carried thereby, a latch operatively associated with said pinion, a contact maintained in closed circuit position when said pinion is operatively associated with said latch, and insulating means associated with said latch for operating the latter to release said pinion therefrom and permit said contact to open the circuit.

38. A self soldering circuit breaker of the plunger type, including plunger type switch operable circuit breaking means, a fusibly mounted pinion associated with said plunger switch means, a latch in engagement with said pinion for controlling said switch means, manually operable means for closing said switch means, and other manually operable means for releasing the latch for releasing the plunger switch means.

39. In a thermal circuit breaker, the combination of a circuit breaker switch means, a catch therefor, fusible means for maintaining said catch in operative position and for releasing said catch upon the passage of a predetermined current through said switch means, manually operated means for closing said switch means, other manually operated means for opening said switch means and releasing the same from engagement with said catch, and a high resistance contact means associated with said switch means for taking the arc when the circuit breaker switch means is open.

40. A self soldering circuit breaker of the plunger type, including plunger type switch operable circuit breaking means, a fusibly mounted pinion associated with said plunger switch means, a latch in engagement with said pinion for controlling said switch means, manually operable means for closing said switch means, other manually operable means for releasing the latch for releasing the plunger switch means, and a high resistance contact means associated with said switch means for taking the arc when the circuit breaker switch means is open.

41. A self soldering circuit breaker, including a pair of parallel plates, plunger switch means positioned between said plates, a fusibly mounted pinion, a latch in engagement therewith for controlling the plunger switch means, manually operable means for releasing said latch to release said switch means, and other manually operable means for actuating said plunger switch means to close said switch means.

42. In a thermally operable circuit breaker, the combination of a thermal element having a pair of arms lying adjacent each other and a mid-portion connecting the same and relatively free, through said mid-portion of which current passes from arm to arm, and means positioned adjacent and cooperating with said mid-portion for maintaining the circuit breaker in closed position and automatically operable to release the circuit breaker and permit breaking of the circuit including the thermal element.

43. A device as defined by claim 42, characterized by the addition of switch means for breaking the circuit other than at the mid-portion of the thermal element..

44. A device as defined by claim 42, characterized by the cooperating means being independent electrically of the circuit through the thermal element, which circuit is automatically broken by release of said cooperating means.

45. A device as defined by claim 42, characterized by the cooperating means being independent of the circuit through the thermal element other than the heating thereof, which circuit is automatically and simultaneously broken by release of said cooperating means upon the predetermined heating of the thermal element.

46. A device as defined by claim 42, characterized by the cooperating means including a tiltable member manually connected to the thermal element mid-portion for maintaining the circuit breaker in closed circuit position.

47. A device as defined by claim 42, characterized by the cooperating means including an insulatably and tiltably mounted catch, and a manually operable re-setting member for moving said catch towards the mid-portion of the thermal element and into cooperating engagement, the mid-portion of said thermal element upon the passage of an abnormal current therethrough permitting the release of said catch and the automatic opening of the circuit through said thermal element.

48. A device as defined by claim 42, characterized by the cooperating means including an insulatably and tiltably mounted catch and a manually operable resetting member for moving said catch toward the mid-portion of the thermal element and into cooperating engagement, said mid-portion upon the passage of an abnormal current therethrough being releasable from said catch for automatically opening the circuit through said thermal element.

49. In a thermal circuit breaker, the combination of a thermal element having a pair of arms lying adjacent each other and a mid-portion connecting the same and relatively free, through said mid-portion of which the current passes from arm to arm, and a pivotally supported catch member, the mid-portion of said thermal element upon the passage of an abnormal current therethrough being movable upwardly from a plane including the catch pivot and parallel to the normal position of the mid-portion and arm portions immediately adjacent thereto for automatically breaking the circuit therethrough remote from said mid-portion.

50. A device as defined by claim 42, characterized by the cooperating means including a tiltable member mechanically connected to the thermal element mid-portion for maintaining the circuit breaker in closed circuit position and tiltably mounted upon a base insulated from the circuit to be broken.

51. A device as defined by claim 42, characterized by the cooperating means including an insulatably and tiltably mounted catch and a manually operable re-setting member for moving said catch towards the mid-portion of the element and into cooperating engagement, the mid-portion of said thermal element upon the passage of an abnormal current therethrough being releasable from said catch for automatically opening the circuit through said thermal element, said tiltably mounted catch being so arranged that it is not a part of the circuit through the thermal element end which is broken.

52. In a thermal circuit breaker, the combination of a U-shaped thermal element having its ends anchored and its mid-portion relatively free and through the mid-portion of which the current passes from one end to the other, and means positioned adjacent and cooperating with said U-shaped thermal element mid-portion for maintaining the circuit breaker in closed circuit position and automatically operable to break the circuit upon the passage of an abnormal current through said U-shaped thermal element mid-portion.

In witness whereof, I have hereunto affixed my signature.

ROY H. MAPLE.